Aug. 15, 1939.  H. E. HOLLMANN  2,169,358
RECEIVER FOR ULTRA-SHORT WAVES
Filed June 18, 1937
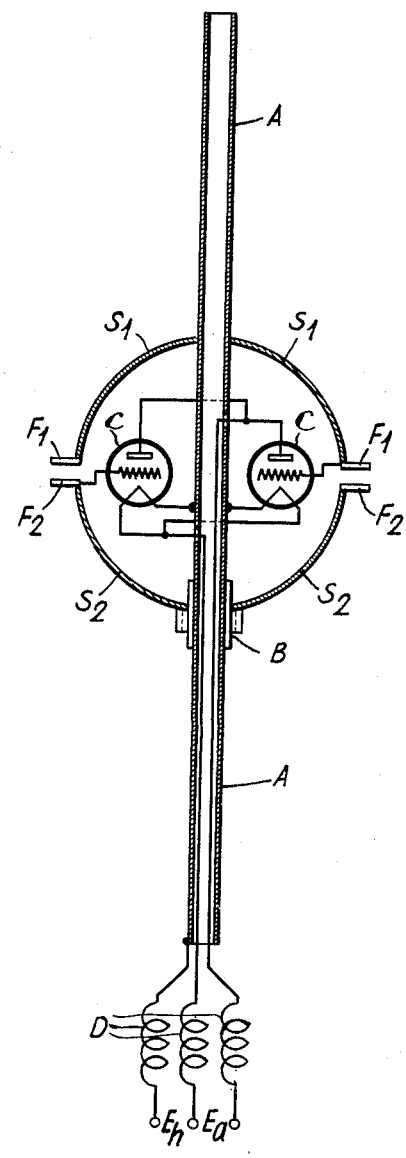
INVENTOR
HANS E. HOLLMANN
BY
ATTORNEY Patented Aug. 15, 1939

2,169,358

UNITED STATES PATENT OFFICE 2,169,358

RECEIVER FOR ULTRA-SHORT WAVES

Hans E. Hollmann, Berlin, Germany, assignor to Telefunken Gesellschaft für Drahtlose Telegraphie m. b. H., Berlin, Germany, a corporation of Germany Application June 18, 1937, Serial No. 148,860
In Germany July 18, 1936

6 Claims. (Cl. 250—20)

It is known that difficulties are encountered in obtaining high resonance potentials, such as are designed for an effective control of a detector, in an ultra-short wave antenna having a high radiation damping. This is especially the case in a dipole tuned one or more half waves in length, so that there has been suitably provided heretofore, a secondary circuit coupled with the antenna whose damping can be substantially lower, therefore supplying high resonance potentials (i. e. possessing high selectivity). At the same time a static shielding, as complete as possible, of the actual receiver, i. e., preferably of the detector elements is desirable in order to protect the latter against atmospheric or other disturbances and against the aperiodic reception (interference) of longer waves. When placing an oscillatory circuit for ultra-short waves in a metal casing shielding said circuit, its damping will thereby be increased, unless the casing has inconveniently large dimensions, and therefore the effectiveness of a secondary circuit will thereby be detrimentally affected.

In accordance with the invention these disadvantages are avoided by forming the resonance or tuned circuit which is connected to the detector—whether it operates as primary circuit or as secondary circuit coupled with an antenna—as a hollow body capable of resonance action and containing within it the receiver and detector circuits. If the hollow body is so dimensioned that it will be in resonance with the wave to be received, it acts as a shield against all waves which are longer than the wave to be received.

The drawing shows an ultra-short wave receiver as a practical embodiment of the invention. Item A is a hollow metallic rod-like dipole tuned to the receiving wave and carrying in the center two half spherical cups $S_1$ and $S_2$ of sheet metal. These two spherical cups, whose edges face each other, form a resonant circuit and represent directly the axial symmetrical secondary circuit directly coupled with the dipole. The natural or resonant wave of the oscillatory circuit formed by cup $S_1$ and $S_2$ depends, to some extent, on the mutual capacity of the two spherical cups and can be varied by the relative displacement of the cups along the dipole. To effect such a variation, the bottom cup is mounted on the dipole with a screw thread B. In order to enlarge the tuning range, the capacity of the oscillatory circuit can be increased by the two spaced flanges $F_1$ and $F_2$.

In case of waves having a length of a few meters this spherical secondary circuit has sufficiently large dimensions to accommodate a detector tube in its interior. In order that the symmetry of the entire arrangement will not be disturbed to any appreciable degree it is advisable to employ two detector tubes, C, C operating in push-pull, or a corresponding twin tube whose grids are connected in the manner shown in the drawing to the edges of the two half spheres or to the flanges at which the voltage loops are formed.

It is obvious that instead of moving the cups for tuning the secondary circuit, the same result can be obtained by varying the mutual capacity of said cups in any other way; for instance, by varying the intermediate dielectric or by sliding a metallic layer between the flanges $F_1$ and $F_2$, and which layer must be insulated at least against the one of said flanges. The current is supplied across the dipole A as indicated in the construction shown in the figure. Choke coils D are employed to avoid an undesirable grounding or load effect. This arrangement has the practical advantage that the entire receiver, when once tuned to the wave to be received, can be very easily mounted on a mast at a greater height from the ground. Obviously, in place of an ordinary tube operating with plate or grid detection, other types of tubes may be employed.

In the example described a separate receiving antenna is provided feeding the secondary circuit which controls the receiver elements. In case of a sufficiently high field intensity the dipole may however be dispensed with whereby the hollow body enclosing the receiver elements suffices as antenna.

What I claim is:

1. An ultra-short wave system comprising an oscillatory circuit constituted by a conducting rod and a pair of hollow semi-spherical shaped metallic members spaced along said rod and electrically connected thereto, said members being arranged to form a hollow sphere and being separated from each other at their adjacent edges, whereby there is a capacity effect between said adjacent edges, said conducting rod being arranged to pass through both of said members to form a dipole antenna, and a multi-electrode electron discharge device located within said sphere and having one of its electrodes connected to said rod, and another of its electrodes connected to one of said members.

2. An ultra-short wave system comprising an oscillatory circuit constituted by a conducting rod and a pair of hollow semi-spherical shaped metallic members spaced along said rod and electrically connected thereto, said members being arranged to form a hollow sphere and being separated from each other at their adjacent edges, whereby there is a capacity effect between said adjacent edges, said conducting rod being arranged to pass through both of said members to form a dipole antenna, and a multi-electrode electron discharge device located within said hollow sphere, said device having a cathode, anode and grid, a connection between said cathode and said rod, a connection between said grid and the edge of one of said members, and a connection extending from said anode to a source of potential located externally of said hollow sphere.

3. An ultra-short wave system comprising an oscillatory circuit constituted by a conducting rod and a pair of hollow semi-spherical shaped metallic members spaced along said rod and electrically connected thereto, said members being arranged to form a hollow sphere and being separated from each other at their adjacent edges, whereby there is a capacity effect between said adjacent edges, said conducting rod being arranged to pass through both of said members to form a dipole antenna, and a pair of space discharge paths located within said sphere, each of said paths including a control electrode, said control electrodes being connected to different edges of said semi-spherical members.

4. An ultra-short wave receiving system comprising an oscillatory circuit constituted by a hollow conducting rod and a pair of hollow semi-spherical shaped metallic members spaced along said rod and electrically connected thereto, said members being arranged to form a hollow sphere and being separated from each other at their adjacent edges, whereby there is a capacity effect between said adjacent edges, said conducting rod being arranged to pass through both of said members to form a dipole antenna, and a pair of detecting space-charge paths located within said sphere, each of said paths including a grid, a source of electrons, and an anode, means for connecting said grids to said oscillatory circuit such that opposite instantaneous polarities are impressed on said grids relative to each other, a connection within said hollow rod extending from said sources of electrons to a source of heating energy located externally of said sphere.

5. An ultra-short wave system comprising an oscillatory circuit constituted by a conducting rod and a pair of hollow metallic members spaced along said rod and electrically connected thereto, said members being arranged to form substantially a hollow surface of revolution and being separated from each other at their adjacent edges, whereby there is a capacity effect between said adjacent edges, said conducting rod being connected to and arranged to pass through both of said members to form a dipole antenna, and a multi-electrode electron discharge device located within said hollow surface of revolution and having one of its electrodes connected to one of said members.

6. An ultra-short wave system comprising an oscillatory circuit constituted by a conducting rod and a pair of hollow metallic members spaced along said rod and electrically connected thereto, said members being arranged to form substantially a hollow surface of revolution and being separated from each other at their adjacent edges, whereby there is a capacity effect between said adjacent edges, said conducting rod being connected to and arranged to pass through both of said members to form a dipole antenna, said rod extending substantially equal distances beyond both hollow metallic members, and a multi-electrode electron discharge device located within said hollow surface of revolution and having one of its electrodes connected to one of said members.

H. E. HOLLMANN.